US010219186B1

(12) United States Patent
Tailor et al.

(10) Patent No.: US 10,219,186 B1
(45) Date of Patent: Feb. 26, 2019

(54) USE OF SPEED OF MOVEMENT OF UE AS BASIS TO CONTROL CONNECTION SETUP

(71) Applicant: Sprint Spectrum L.P., Overland Park, KS (US)

(72) Inventors: Pinalkumari Tailor, Ashburn, VA (US); Gurneen Singh, Fairfax Station, VA (US); Dennis Canoy, Ashburn, VA (US); Ankit Mehta, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/683,344

(22) Filed: Aug. 22, 2017

(51) Int. Cl.
| | | |
|---|---|---|
| *H04W 4/00* | (2018.01) |
| *H04W 36/00* | (2009.01) |
| *H04W 72/04* | (2009.01) |
| *H04W 36/32* | (2009.01) |
| *H04W 36/18* | (2009.01) |
| *H04W 36/14* | (2009.01) |
| *H04W 76/15* | (2018.01) |
| *H04W 88/06* | (2009.01) |
| *H04W 8/02* | (2009.01) |
| *H04J 13/16* | (2011.01) |

(52) U.S. Cl.
CPC ....... *H04W 36/0016* (2013.01); *H04W 36/14* (2013.01); *H04W 36/18* (2013.01); *H04W 36/32* (2013.01); *H04W 72/0466* (2013.01); *H04W 76/15* (2018.02); *H04J 13/16* (2013.01); *H04W 8/02* (2013.01); *H04W 88/06* (2013.01)

(58) Field of Classification Search
CPC . H04W 36/0016; H04W 76/15; H04W 36/14; H04W 36/18; H04W 36/32; H04W 72/0466; H04W 8/02; H04W 88/06; H04J 13/16
See application file for complete search history.

(56) References Cited

U.S. PATENT DOCUMENTS

| | | | |
|---|---|---|---|
| 6,330,446 B1 | 12/2001 | Mori | |
| 9,072,009 B1 | 6/2015 | Wurtenberger et al. | |
| 9,629,187 B1 | 4/2017 | Oroskar et al. | |
| 9,749,907 B1 * | 8/2017 | Oroskar | H04W 36/0022 |
| 2010/0040020 A1 * | 2/2010 | Chen | H04W 36/0022 370/331 |
| 2015/0138963 A1 * | 5/2015 | Lee | H04W 4/027 370/230 |

(Continued)

OTHER PUBLICATIONS

"Circuit-switched fallback to 1x voice: Network architecture, options and performance," Qualcomm, White Paper, Jan. 2013.

*Primary Examiner* — Minh Trang T Nguyen

(57) ABSTRACT

When a UE is served by a first RAN and engages in signaling via the first RAN with a second RAN for the second RAN serve the UE with a call (e.g., in a circuit-switched fallback process), the second RAN will determine a speed of movement of the UE and will decide based on the speed of movement whether to provide the UE with a second-RAN traffic channel assignment in addition to providing the UE with an indication of second-RAN coverage in which the call will be served. For instance, if the UE is moving at a threshold high rate of speed, then the entity will provide the UE with a second-RAN traffic channel assignment so as to help expedite the start of the call and to help avoid an issue where the UE may move out of the second-RAN coverage in which the call is to be served.

20 Claims, 3 Drawing Sheets

(56) References Cited

U.S. PATENT DOCUMENTS

2015/0141018 A1* 5/2015 Kapoulas .......... H04W 36/0083
455/437
2015/0208248 A1* 7/2015 Wang ................... H04W 24/02
455/446

* cited by examiner

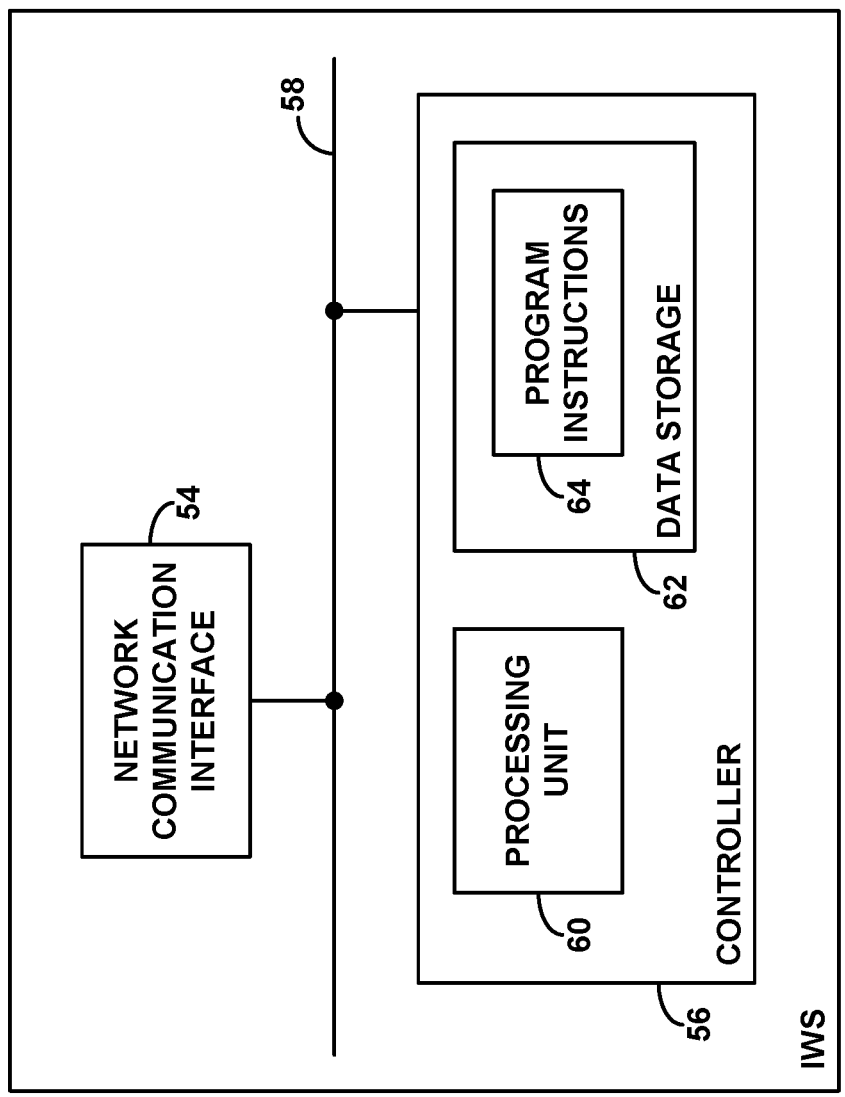

USE OF SPEED OF MOVEMENT OF UE AS BASIS TO CONTROL CONNECTION SETUP

BACKGROUND

A cellular wireless network typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the network could engage in air interface communication with a base station and could thereby communicate via the base station with various remote network entities or with other UEs served by the base station.

Such a network could operate in accordance with a particular air interface protocol (or radio access technology), with communications from the base stations to UEs defining a downlink or forward link and communications from the UEs to the base stations defining an uplink or reverse link. Examples of existing air interface protocols include, without limitation, Long Term Evolution (LTE) (using Orthogonal Frequency Division Multiple Access (OFDMA) and Single-Carrier Frequency Division Multiple Access (SC-FDMA)), Code Division Multiple Access (CDMA) (e.g., 1xRTT and 1xEV-DO), Global System for Mobile Communications (GSM), WI-FI, and BLUETOOTH, among other examples. Each protocol could define its own procedures for registration of UEs, initiation of communications, handoff between coverage areas, and other functions related to air interface communication.

In accordance with the air interface protocol, each coverage area could operate on one or more carrier frequencies and could define on each carrier a number of air interface channels for carrying information between the base station and UEs. These channels could be defined in various ways, such as through frequency division multiplexing, time division multiplexing, and/or code-division multiplexing for instance.

By way of example, on a given carrier frequency, a coverage area could be structured to define a pilot channel or reference channel on which the base station broadcasts a pilot signal or reference signal that UEs could detect as an indication of coverage and could measure to evaluate coverage strength. Further, the coverage area could define one or more uplink control channels on which UEs could transmit control messages such as access requests, registration requests, and scheduling requests to the base station. And the coverage area could define one or more downlink control channels on which the base station could transmit control messages such as scheduling directives, system information messages, and page messages to UEs. Each coverage area could then further define one or more traffic channels or other resource for carrying communication traffic such as voice data and other data between the base station and served UEs.

In some arrangements, when a UE first powers on or enters into coverage of the network, the UE could scan for and identify a strongest pilot or reference signal and could register with the network by transmitting a registration request or attach request to a base station providing that signal. This registration process could serve to notify the network of UE's presence in a particular coverage area and could facilitate network authentication of the UE. Once registered, the UE could then operate in an idle mode in which the UE has no assigned traffic channel resources on which to engage in bearer communication but the UE monitors a downlink control channel to receive overhead information and to check for any page messages.

When the network has a communication (such as a voice call or other traffic) to provide to a UE that is registered with the network but is operating in the idle mode, the network could page the UE in an effort to then facilitate assigning traffic channel resources to the UE. In particular, the network could transmit on the downlink a page message addressed to the UE. Assuming the UE receives this page message, the UE could then transmit to the network a page response message on the uplink. And upon receipt of the page response message, the network could then assign traffic channel resources to the UE, for use to carry the communication, thus transitioning the UE to a connected or active mode in which the UE could engage in the communication.

Likewise, when an idle UE seeks to initiate (originate) a communication, such as to place a voice call or engage in other bearer communication, the UE could transmit on the uplink to the base station an origination or connection request, and the network could then assign traffic channel resources to the UE for use to carry the communication, similarly transitioning the UE to a connected or active mode in which the UE can engage in the communication.

OVERVIEW

In communication systems that provide service under more than one air interface protocol, service providers could implement functionality that allows UEs to operate on one air interface protocol and to dynamically switch over to operate on another air interface protocol to engage in certain communications. By way of example, in a system that supports both LTE service for mobile broadband and another protocol such as CDMA or GSM for traditional voice calls, service providers could implement "circuit switched fallback" (CSFB) functionality, which allows UEs to operate by default on LTE and to switch over to operate on CDMA or GSM to engage in voice calls.

In a typical CSFB implementation with LTE and CDMA, signaling infrastructure of the LTE network is connected by an interworking server (IWS) with signaling infrastructure of the CDMA network, to allow control signaling to flow between the LTE and CDMA networks. A CSFB-capable UE could then be arranged by default to scan for and register (attach) with the LTE network and, once so registered, to then register with the CDMA network via the LTE network, thereby informing the CDMA network that the UE is accessible via the LTE network. The UE could then operate with LTE service until it becomes necessary to place or receive a voice call. And to then place or receive a voice call, the UE could conveniently engage in call setup signaling with the CDMA network via the LTE network and then transition from LTE service to CDMA service to engage in the call.

As a more specific example of this, after a UE connects with an LTE base station and attaches with the LTE network, the UE could then transmit a CDMA registration message via the LTE air interface to the LTE base station. The CDMA registration message could then pass via the LTE base station to a mobility management entity (MME) of the LTE network and from there via an inter-network interface (e.g., an S102 interface) to the IWS and in turn to a mobile switching center (MSC) of the CDMA network. The MSC could thus record the fact that the UE is accessible via the LTE network (namely, via the IWS and S102 interface with the MME).

Once the UE is so registered with the CDMA network and is operating in LTE service, if the UE seeks to place a voice call, the UE could transmit an extended service request (ESR) message to the LTE base station, to which the LTE base station could respond by directing the UE to scan for CDMA coverage. The UE could then measure CDMA coverage and transmit to the LTE base station a report of CDMA coverage, to which the LTE base station could respond by directing the UE to proceed with CDMA call-setup signaling. Alternatively, if the MSC has a an incoming call to connect to the UE, the MSC could page the UE by transmitting a page-trigger message via the IWS and S102 interface to the MME, causing the MME to coordinate paging of the UE by the LTE base station. And in response to the paging of the UE, the UE could then similarly send an ESR to the LTE base station, receive a measurement directive from the LTE base station, and measure and report CDMA coverage, and the LTE base station could similarly direct the UE to proceed with CDMA call-setup signaling.

The UE could then generate a CDMA call setup message, such as a call origination message (ORM) or page response message (PRM), and transmit the message to LTE base station, with the message then flowing from the LTE base station to the MME and over the S102 interface to the IWS. Further, the LTE base station could append to the call-setup message an indication of the CDMA coverage reported by the UE, so that the IWS would receive both the UE's call setup message and the report of the CDMA coverage detected by the UE.

Provided with this information, the IWS could then work with the MSC to have the MSC set up the call in a CDMA coverage area reported by the UE, such as the strongest reported coverage area or another reported coverage area for load-balancing reasons or the like. And the IWS could then transmit to the UE, via the S102 interface, the MME, and the LTE base station, a directive for the UE to switch from LTE service to CDMA service so as to engage in the call in the CDMA coverage area. The UE could then responsively suspend its LTE service and transition from LTE service to CDMA service in the indicated CDMA coverage area, to engage in the call served by the CDMA network.

With this or other implementations of CSFB, there are at least two mechanisms that the IWS (in cooperation with the MSC) could use for transitioning the UE from LTE service to CDMA service and specifically for transitioning the UE to a CDMA connection so that the UE could engage in the CSFB call.

Both mechanisms involve the IWS providing in its final directive to the UE an indication of the CDMA coverage in which the call will be served so that the UE can readily transition to operate in that CDMA coverage. For instance, the IWS could include in its final directive to the UE an identifier of the CDMA coverage area, such as a pseudo-noise (PN) offset specific to the coverage area, along with an indication of a carrier frequency on which the call will proceed in that coverage area. However, the mechanisms could differ from each other in terms of whether the IWS also includes in its directive to the UE an assignment of a CDMA traffic channel, e.g., a specific Walsh-coded channel, on which the call will be carried in the indicated CDMA coverage area.

Namely, one mechanism involves the IWS working with the MSC to establish a CDMA traffic-channel assignment for the call in the CDMA coverage area and the IWS then transmitting to the UE as the final directive a Universal Handoff Direction Message (UHDM) that specifies the coverage area identifier, the carrier frequency, and the traffic-channel assignment. Upon receipt of the UHDM, the UE could then responsively transition from LTE to the indicated CDMA coverage area and carrier frequency and quickly commence the call on the assigned traffic channel.

Whereas, the other mechanism involves the IWS instead transmitting to the UE an enhanced Channel Assignment Message (eCAM) that specifies the coverage area identifier and the carrier frequency but does not specify a CDMA traffic channel assignment for the call in the indicated coverage area. In response to this eCAM, the UE could then similarly transition from LTE to the indicated CDMA coverage area, but the UE would then then need to engage in further signaling with the CDMA base station that provides that coverage area, to request and receive assignment of a CDMA traffic channel for the call. For instance, the UE may need to engage in random access signaling with the base station, in response to which the CDMA base station could then assign to the UE a traffic channel for the call in the CDMA coverage area and provide the UE with a directive for the UE to proceed with the call on the assigned traffic channel.

In some or all situations when implementing CSFB, an IWS could be configured by default to use the eCAM mechanism rather than the UHDM mechanism. For instance, the IWS might be configured to use the eCAM mechanism by default when the CDMA coverage area selected for carrying the call is not the strongest of the CDMA coverage areas reported by the UE, or in other situations.

Unfortunately, however, the eCAM mechanism could result in a problem if the UE is moving quickly enough at the time the CSFB call is being set up. In particular, if the UE is moving quickly enough at that time, there is a chance that, by the time the UE transitions from LTE to CDMA and seeks to access a CDMA base station and acquire assignment of a CDMA traffic channel, the UE may have moved out of coverage of the UE-reported CDMA coverage area that the IWS and MSC had selected to carry the call. In that case, the UE might successfully engage in random access signaling in that CDMA coverage area (e.g., signaling on a Walsh-coded random access channel in the coverage area having the specified PN-offset, on the specified carrier frequency), but the UE might move out of that CDMA coverage area before receiving a random access response or before commencing the call in that CDMA coverage area. Ultimately, the UE might then resort to scanning for other CDMA coverage and trying again to connect. But this could significantly delay the call setup process and might even result in failure of call setup.

Disclosed herein is a method and system to help overcome this problem. In accordance with the disclosure, the speed of movement of the UE at the time of CSFB call setup will be used as basis to determine which mechanism to use for transitioning the UE from LTE service to a CDMA call connection. In particular, at the time of CSFB call setup, a determination will be made as to how quickly the UE is moving and whether the UE's speed of movement is threshold high (e.g., meets or exceeds a predefined threshold speed of movement). If the determination is that the UE's speed of movement is not threshold high, then directive for the UE to transition from LTE to a fallback network to engage in the call will not include a traffic-channel assignment for the call. Whereas, if the determination is that the UE's speed of movement is threshold high, then the directive for the UE to transition from LTE to the fallback network to engage in the call will include a traffic-channel assignment for the call.

As a specific example of this in the LTE/CDMA implementation as discussed above, if the determination is that the UE's speed of movement at the time of CSFB call setup is not threshold high, then, based on that determination, the IWS could provide the UE with an eCAM that specifies the CDMA coverage (e.g., PN offset and carrier frequency) in which the call will occur, but that does not specify a Walsh-coded traffic channel that will carry the call in that CDMA coverage. The UE could then transition from LTE to CDMA and engage in random access signaling and traffic-channel acquisition in the specified CDMA coverage area.

Whereas, if the determination is that the UE's speed of movement a the time of CSFB call setup is threshold high, then, based on that determination, the IWS could instead provide the UE with a UHDM that specifies the CDMA coverage in which the call will occur, and that further specifies a Walsh-coded traffic channel that will carry the call in that CDMA coverage. Provided with this information, the UE could then more readily commence the call in the indicated CDMA coverage on the assigned traffic channel. And if the UE is moving out of that CDMA coverage, conventional CDMA handover procedures could apply to more seamlessly transition the call to another CDMA coverage area.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

FIG. 3 is a simplified block diagram of an IWS operable in an example implementation.

DETAILED DESCRIPTION

An example implementation will now be described in the context of a system that includes an LTE RAN and a legacy CDMA RAN. It should be understood, however, that the disclosed principles can extend to other air interface protocols and other network arrangements as well, with variations where appropriate. Further, even within the context of the hybrid LTE-CDMA system described, numerous variations from the specific arrangements and processes described are possible. For instance, various described machines, connections, functions, and other elements could be added, omitted, distributed, re-located, re-ordered, combined, or changed in other ways.

Figure 1:
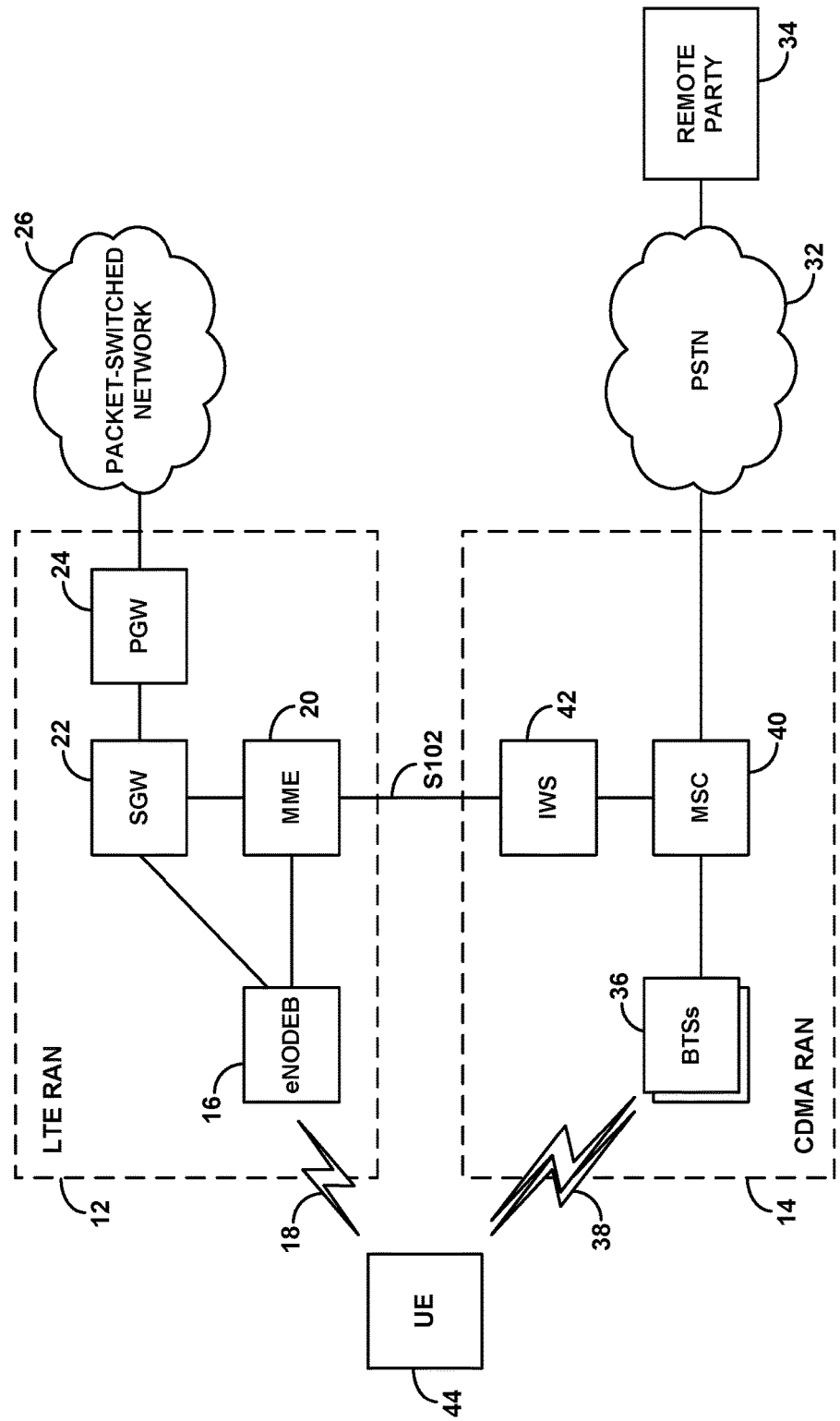
FIG. 1 is a simplified block diagram of a network arrangement in which aspects of the present disclosure can be implemented.

FIG. 1 is a simplified block diagram of the example system, including an LTE RAN 12 and a CDMA RAN 14. In the example system, the LTE RAN primarily serves UEs with wireless packet data communication service. Whereas the CDMA RAN primarily serves UEs with wireless circuit-switched voice call service. These RANs may be owned or operated by a common wireless service provider, enabling the provider to serve UEs with high speed packet data service through the LTE RAN and traditional cellular voice call service through the CDMA RAN.

The LTE RAN 12 in the example system is shown including a representative LTE base station 16 known as an evolved Node-B (eNodeB), which includes an antenna structure and associated equipment for providing an LTE coverage area 18 in which UEs can be served by the eNodeB and thus by the LTE RAN. The eNodeB is then shown having a communication interface with an MME 20 that functions as a signaling controller for the LTE RAN. Further, the eNodeB is also shown having a communication interface with a serving gateway (SGW) 22, which is in turn shown having a communication interface with a packet-data network gateway (PGW) 24 that provides connectivity with a packet-switched network 26, and the MME is shown having a communication interface with the SGW. In practice, the illustrated components of the LTE RAN could sit as nodes on a private packet-switched network owned by an operator of the LTE RAN. Therefore, the various communication interfaces could be tunnels defined in that network.

The CDMA RAN 14, on the other hand, is shown including multiple representative CDMA base stations 36 known as a base transceiver stations (BTSs), each of which includes an antenna structure and associated equipment for providing one or more CDMA coverage areas 38 (e.g., CDMA sectors) in which UEs can be served by the BTS and thus by the CDMA RAN. The BTS is then shown in communication (possibly through a base station controller (BSC) (not shown)) with an MSC 40 that provides connectivity with the PSTN 32 and that functions to set up call connections (e.g., with a remote party 34) over the PSTN for UEs served by the CDMA RAN.

Further shown in FIG. 1 is then an IWS 42, which serves as a signaling intermediary between the LTE RAN and the CDMA RAN to facilitate functions such as CSFB. The IWS, which is considered an element of the CDMA RAN, has an inter-network S102 interface with the MME of the LTE RAN and is further interfaced or integrated with the MSC of the CDMA RAN. Other arrangements are possible as well.

FIG. 1 illustrates a representative UE 44 located within both coverage area 18 of the LTE RAN and a coverage area 38 of the CDMA RAN. This representative UE is a hybrid telephony device (e.g., cell phone or other such device), equipped to support both LTE service and CDMA service and is thus capable of being served by both the LTE RAN and the CDMA RAN and engaging in voice calls served the CDMA RAN. In practice, the UE could prioritize being served by the LTE RAN but could be configured to support CSFB service. Therefore, upon entry into coverage area 18 of the LTE RAN, the UE could connect with the eNodeB and attach with the LTE network by engaging in signaling with the eNodeB and in turn with the MME 20. Further, the UE could then register with the CDMA RAN via the LTE RAN. In particular, the UE could transmit a CDMA registration request to the eNodeB, and the request would flow from the eNodeB to the MME and over the S102 interface to the IWS and in turn to the MSC, thereby registering the UE for CDMA service without the UE leaving LTE.

As noted above, in this state, the UE could engage in call-setup signaling with the CDMA RAN via the LTE RAN, to place or receive a voice call that will be served by the CDMA RAN. And upon receipt of a directive from the CDMA RAN to then transition from LTE to CDMA to engage in the call, the UE could responsively leave LTE and tune to CDMA to engage in the call served by the CDMA RAN.

For instance, as discussed above, the UE could transmit to MME 20, via coverage area 18 and eNodeB 16, an ESR when the UE seeks to originate a call or respond to a CDMA page message, and the MME could then command the eNodeB to process a CSFB procedure. The eNodeB could then provide the UE with information about CDMA coverage (e.g., PN offsets and carrier frequencies) in the vicinity and direct the UE to evaluate and report CDMA coverage. And the UE could responsively scan for the indicated CDMA coverage and transmit to the eNodeB a measurement report indicating signal strengths (e.g., signal-to-noise ratio, such as Ec/Io) of CDMA coverage areas that the UE detects. Assuming the UE reported sufficient CDMA signal strength, the eNodeB could then direct the UE to proceed with the CSFB process. And the UE could responsively transmit a call-setup request such as an ORM or PRM to the eNodeB, which would flow from the eNodeB to the MME and over the S102 interface to the IWS.

As noted above, the IWS at this point could then process the UE's call-setup request using either of the mechanisms noted. For instance, the IWS could engage in signaling and/or other processing with the MSC to select particular UE-reported CDMA coverage 38 in which to serve the UE with the call, and to have the MSC process setup of the call. The IWS could then transmit to the UE, via the S102 interface, MME, eNodeB, and LTE coverage 18, an eCAM that specifies the selected CDMA coverage (e.g., PN-offset and carrier frequency), in response to which the UE could then transition to that CDMA coverage and engage in random access signaling in an effort to acquire a CDMA traffic channel on which to engage in the call. Alternatively, the IWS could interwork with the MSC (e.g., via an A1 interface) to cause a CDMA traffic channel to be assigned in the selected CDMA coverage, and the IWS could transmit to the UE, via the S102 interface, MME, eNodeB, and LTE coverage 18, a UHDM that specifies the CDMA coverage and the assigned CDMA traffic channel on which to engage in the all, and the UE could then readily transition from LTE to CDMA to engage in the call on the assigned CDMA traffic channel in the specified CDMA coverage.

As further noted above, the IWS's choice of whether to use the eCAM mechanism or rather the UHDM mechanism could be based, at least in part (perhaps in addition to one or more other factors) on a current speed of movement of the UE. In particular, if the UE is moving threshold fast, then the IWS could use the UHDM mechanism in an effort to let the call commence more quickly. Whereas, if the UE is not moving threshold fast, then the IWS could use the eCAM mechanism.

To facilitate making this choice, the IWS could learn of the UE's speed of movement in various ways. As a general matter, for instance, the UE could report its speed of movement separate from or along with the call-setup message that the UE sends via the LTE RAN to the IWS, or the LTE RAN could report the UE's speed of movement by appending the speed information to the UE's call-setup message or in separate messaging to the IWS. Thus, the IWS could receive an indication of the UE's speed of movement through signaling from the UE or signaling from the LTE RAN, among other possibilities.

The UE could track its own speed of movement with the assistance of a satellite-based positioning system, using a Global Positioning System (GPS) module integrated in the UE for instance. In particular, with such a system, the UE could periodically determine its geographic location and could thereby determine its speed of movement as a distance that the UE moves per unit time. Alternatively, the UE might track its speed of movement in other ways, such as by tracking how quickly the UE transitions between various coverage areas or sensing its rate of transition between other networks, beacons, or the like. The UE could then specify its current speed of movement within a field of its call-setup message transmission to the IWS or in a separate message to the IWS.

Alternatively, the LTE RAN could determine or track the UE's speed of movement by receiving location reports from the UE and/or implementing a location-determination platform. By way of example, the UE could include an indication of its current geographic location within periodic LTE measurement reports that the UE sends to its serving eNodeB, and the eNodeB, the MME, or one or more other LTE RAN elements could record that location information and determine based on the information the UE's speed of movement. And as another example, a location-determination platform in the LTE RAN could periodically engage in a process to determine the UE's location, perhaps with trilateration based on UE receipt and reporting of GPS signals or the like, and could similarly determine from such information the UE's speed of movement. The eNodeB, MME, or other LTE element could then append an indication of the UE's speed of movement to messaging that the UE sends to the IWS or could report the UE's speed of movement to the IWS in another manner.

In practice, the UE's speed of movement could be a measure of distance per unit time. Alternatively or additionally, at issue could be whether the UE is moving at all or is rather stationary, in which case, the indication of the UE's speed of movement could be a Boolean indication of whether or not the UE is currently moving. This indication could be established in the manners noted above and/or might be established based simply on profile data indicating whether the UE is of the type that could move or is rather in fixed position (e.g., affixed at a specific location).

In any event, the IWS or other entity that implements this process could be configured with logic that defines a particular UE speed-of-movement threshold, so as to determine whether the UE's speed of movement at the time of the CSFB call setup process is threshold high. This defined speed-of-movement threshold could be set by engineering design to be a speed such that, if the UE is moving at the speed, there is at least a reasonable chance that the UE might encounter an issue like that discussed above.

As with the speed determined by the IWS, the speed threshold could be a particular distance per unit time, in which case if the determined speed of movement of the UE is at least as high as the threshold speed, then the IWS could use the UHDM process, whereas, if the determined speed of movement of the UE is not at least as high as the threshold speed, then the IWS could use the eCAM process. Alternatively, the threshold could be a Boolean indication that the UE is moving at all (akin to possibly any positive speed value), in which case, if the determination is the UE is moving, then the IWS could use the UHDM process, whereas, if the determination is that the UE is not moving, then the IWS could use the eCAM value. The IWS could consider additional factors as well.

Figure 2:
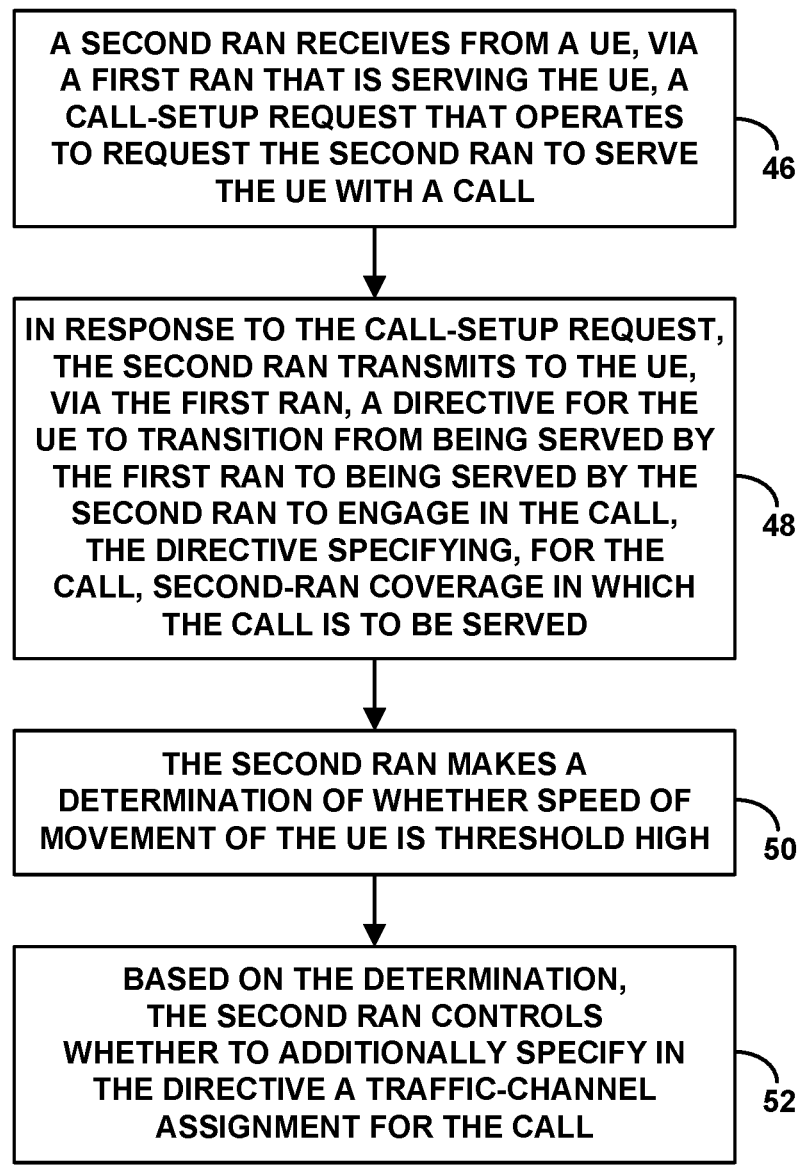
FIG. 2 is a flow chart depicting operations that can be carried out in accordance with the disclosure.

FIG. 2 is a flow chart depicting operations that can be carried out by an IWS or other entity in accordance with this disclosure (e.g., as part of a CSFB process), to control connection setup for a UE when the UE is served by a first RAN that has an inter-network interface with a second RAN.

As shown in FIG. 2, at block 46, the second RAN receives from the UE, via the first RAN and the inter-network interface, a call-setup request (e.g., an ORM or PRM) that operates to request the second RAN to serve the UE with a call. At block 48, in response to the call-setup request, the second RAN transmits to the UE, via the first RAN and the inter-network interface, a directive for the UE to transition from being served by the first RAN to being served by the second RAN to engage in the call, the directive specifying, for the call, second-RAN coverage (e.g., a coverage area and perhaps carrier frequency of the second RAN) in which the call is to be served.

At block 50, the second RAN then makes a determination of whether speed of movement of the UE is threshold high. And at block 52, based on the determination, the second RAN controls whether to additionally specify in the directive a traffic-channel assignment for the call. In particular, based on the determination being that speed of movement of the UE is not threshold high (e.g., if the determination is that the speed of movement of the UE is not threshold high), the second RAN does not additionally specify in the directive a traffic-channel assignment for the call. Whereas, based on the determination being that the speed of movement of the UE is threshold high (e.g., if the determination is that the speed of movement of the UE is threshold high), the second RAN additionally specifies in the directive a traffic-channel assignment for the call.

In line with the discussion above, the first RAN could operate according to a first radio access technology (e.g., LTE), and the second RAN could operate according to a second radio access technology different than the first radio access technology (e.g., CDMA or GSM). Further, the operations shown in FIG. 2 could be carried out by an IWS of the second RAN. And as discussed above, the directive not additionally including a traffic-channel assignment for the call could be an eCAM, whereas, the directive additionally including a traffic-channel assignment for the call could be a UHDM.

As additionally discussed above, the act of the second RAN making the determination of whether speed of movement of the UE is threshold high could involve the second RAN determining the speed of movement of the UE (e.g., receiving with the call-setup request from the UE an indication of the speed of movement of the UE) and the second RAN determining whether that determined speed of movement of the UE is at least as high as a predefined speed of movement. Further or alternatively, the act of the second RAN making the determination of whether speed of movement of the UE is threshold high could involve the second RAN whether the UE is moving or is rather stationary.

In addition, as discussed above, the act of additionally specifying in the directive a traffic-channel assignment for the call could operate to inform the UE of a traffic-channel on which to engage in the call in the specified second-RAN coverage, thereby enabling the UE to tune to the traffic channel and begin the call without the UE first needing to engage in associated random access signaling with the second RAN.

FIG. 3 is next a simplified block diagram of a computing apparatus operable in accordance with the present disclosure, to help control connection setup for a UE in a system that includes a first RAN and a second RAN, and where the computing apparatus is disposed in the second RAN. In particular, the figure depicts the computing apparatus as an IWS, which as discussed above could be implemented as a network entity within the second RAN. Specifically, the computing apparatus could be a computer server or server platform made of one more computers operable to carry out features such as those discussed above.

As shown in FIG. 3, the computing apparatus includes a network communication interface 54 and a controller 56, which could be integrated or interconnected with each other by a system bus, network, or other connection mechanism 58.

Through the network communication interface 54, the computing apparatus is effectively configured to engage in communication with the first RAN and perhaps further with one or more entities of the second RAN. The network communication interface could comprise one or more network communication modules, such as Ethernet interface circuits or the like, along with associated software to support network communication according to agreed protocols on various interfaces.

The controller 56 then operates to cause the apparatus to carry out various operations such as those described above. As shown, the controller could include a processing unit 60 (e.g., one or more microprocessors or other types of processors), non-transitory data storage 62 (e.g., one or more volatile and/or non-volatile storage components, such as magnetic, optical, or flash storage), and program instructions 64 stored in the data storage and executable by the processing unit 60 to carry out various described operations for controlling connection setup for a UE when the UE is served by the first RAN (i.e., through coverage of the first RAN).

In line with the discussion above, for instance, the operations could include receiving from the UE, via the first RAN and the network communication interface, a call-setup request (e.g., ORM or PRM) that requests the second RAN to serve the UE with a call. Further, the operations could include responding to the call-setup request by transmitting to the UE, via the network communication interface and the first RAN, a directive for the UE to transition from being served by the first RAN to being served by the second RAN to engage in the call, the directive specifying, for the call, second-RAN coverage in which the call is to be served.

In addition, the operations could include making a determination of whether speed of movement of the UE is threshold high and, based on the determination, controlling whether the computing apparatus additionally specifies in the directive a traffic-channel assignment for the call. In particular, as discussed above, based on the determination being that speed of movement of the UE is not threshold high, the computing apparatus does not additionally specify in the directive a traffic-channel assignment for the call. Whereas, based on the determination being that the speed of movement of the UE is threshold high, the computing apparatus additionally specifies in the directive a traffic-channel assignment for the call.

Various features discussed above can be applied in this context, and vice versa.

For example, the first RAN could operate according to a first radio access technology (e.g., LTE), and the second RAN could operate according to a second radio access technology different than the first radio access technology (e.g., CDMA or GSM). Further, the computing apparatus could be embodied in an IWS of the second RAN, such as being the IWS for instance. Moreover, the directive not additionally including a traffic-channel assignment for the call could be an eCAM, and the directive additionally including a traffic-channel assignment for the call could be a UHDM.

In addition, the act of making the determination of whether speed of movement of the UE is threshold high could similarly involve determining a speed of movement of the UE, such as by receiving within the call-setup request from the UE an indication of the speed of movement of the UE, and determining whether the determined speed of movement of the UE is at least as high as a predefined threshold speed of movement. Alternatively or additionally, making the determination of whether speed of movement of the UE is threshold high could involve determining whether the UE is moving or is rather stationary.

Further, the act of additionally specifying in the directive a traffic-channel assignment for the call could operate to inform the UE of a traffic-channel on which to engage in the call in the specified second-RAN coverage and could thereby enable the UE to tune to the traffic channel and begin the call without the UE first needing to engage in associated random access signaling with the second RAN.

Exemplary embodiments have been described above. Those skilled in the art will understand, however, that changes and modifications may be made to these embodiments without departing from the true scope and spirit of the invention.

We claim:

1. A method of controlling connection setup for a user equipment device (UE) when the UE is served by a first radio access network (RAN) that has an inter-network interface with a second RAN, the method comprising:
   receiving by the second RAN from the UE, via the first RAN and the inter-network interface, a call-setup request that requests the second RAN to serve the UE with a call;
   responsive to the call-setup request, transmitting to the UE by the second RAN, via the first RAN and the inter-network interface, a directive for the UE to transition from being served by the first RAN to being served by the second RAN to engage in the call, the directive specifying second-RAN coverage in which the call is to be served;
   making a determination by the second RAN of whether speed of movement of the UE is threshold high; and
   based on the determination, controlling by the second RAN whether to additionally specify in the directive a traffic-channel assignment for the call, wherein (i) based on the determination being that speed of movement of the UE is not threshold high, the second RAN does not additionally specify in the directive a traffic-channel assignment for the call, whereas (ii) based on the determination being that the speed of movement of the UE is threshold high, the second RAN additionally specifies in the directive a traffic-channel assignment for the call.

2. The method of claim 1, wherein the first RAN operates according to a first radio access technology, and wherein the second RAN operates according to a second radio access technology different than the first radio access technology.

3. The method of claim 1, wherein the first radio access technology is Long Term Evolution (LTE), and wherein the second radio access technology is selected from the group consisting of Code Division Multiple Access (CDMA) and Global System for Mobile Communications (GSM).

4. The method of claim 1, carried out by an interworking server (IWS) of the second RAN.

5. The method of claim 1, wherein the directive not additionally including a traffic-channel assignment for the call is an enhanced Channel Assignment Message (eCAM), and the directive additionally including a traffic-channel assignment for the call is a Universal Handoff Direction Message (UHDM).

6. The method of claim 1, wherein making the determination by the second RAN of whether speed of movement of the UE is threshold high comprises:
   determining by the second RAN a speed of movement of the UE; and
   determining by the second RAN whether the determined speed of movement of the UE is at least as high as a predefined threshold speed of movement.

7. The method of claim 6, wherein determining by the second RAN the speed of movement of the UE comprises receiving by the second RAN with the call-setup request from the UE an indication of the speed of movement of the UE.

8. The method of claim 1, wherein making the determination by the second RAN of whether speed of movement of the UE is threshold high comprises determining by the second RAN whether the UE is moving or is rather stationary.

9. The method of claim 1, wherein the call-setup request is selected from the group consisting of a call origination message and a page response message.

10. The method of claim 1, wherein additionally specifying in the directive a traffic-channel assignment for the call informs the UE of a traffic-channel on which to engage in the call in the specified second-RAN coverage, thereby enabling the UE to tune to the traffic channel and begin the call without the UE first needing to engage in associated random access signaling with the second RAN.

11. The method of claim 1, carried out as part of a circuit-switched-fallback (CSFB) process.

12. In a system comprising a first radio access network (RAN) and a second RAN interconnected with the first RAN, a computing apparatus disposed in the second RAN and comprising:
   a network communication interface through which the computing apparatus is configured to engage in communication with the first RAN;
   a processing unit;
   non-transitory data storage; and
   program instructions stored in the data storage and executable by the processing unit to carry out operations for controlling connection setup for a user equipment device (UE) when the UE is served by the first RAN,
   wherein the operations include receiving from the UE, via the first RAN and the network communication interface, a call-setup request that requests the second RAN to serve the UE with a call,
   wherein the operations further include responding to the call-setup request by transmitting to the UE, via the network communication interface and the first RAN, a directive for the UE to transition from being served by the first RAN to being served by the second RAN to engage in the call, the directive specifying, for the call, second-RAN coverage in which the call is to be served, and
   wherein the operations further include making a determination of whether speed of movement of the UE is threshold high and, based on the determination, controlling whether the computing apparatus additionally specifies in the directive a traffic-channel assignment for the call, wherein (i) based on the determination being that speed of movement of the UE is not threshold high, the computing apparatus does not additionally specify in the directive a traffic-channel assignment for the call, whereas (ii) based on the determination being that the speed of movement of the UE is threshold high, the computing apparatus additionally specifies in the directive a traffic-channel assignment for the call.

13. The computing apparatus of claim 12, wherein the first RAN operates according to a first radio access technology, and wherein the second RAN operates according to a second radio access technology different than the first radio access technology.

14. The computing apparatus of claim 12, wherein the first radio access technology is Long Term Evolution (LTE), and wherein the second radio access technology is selected from the group consisting of Code Division Multiple Access (CDMA) and Global System for Mobile Communications (GSM).

15. The computing apparatus of claim 12, embodied in an interworking server (IWS) of the second RAN.

16. The computing apparatus of claim 12, wherein the directive not additionally including a traffic-channel assignment for the call is an enhanced Channel Assignment Message (eCAM), and the directive additionally including a traffic-channel assignment for the call is a Universal Handoff Direction Message (UHDM).

17. The computing apparatus of claim 12, wherein making the determination of whether speed of movement of the UE is threshold high comprises:
  determining a speed of movement of the UE, wherein determining by the second RAN the speed of movement of the UE comprises receiving within the call-setup request from the UE an indication of the speed of movement of the UE; and
  determining whether the determined speed of movement of the UE is at least as high as a predefined threshold speed of movement.

18. The computing apparatus of claim 12, wherein making the determination of whether speed of movement of the UE is threshold high comprises determining whether the UE is moving or is rather stationary.

19. The computing apparatus of claim 12, wherein the call-setup request is selected from the group consisting of a call origination request and a page response message.

20. The computing apparatus of claim 12, wherein additionally specifying in the directive a traffic-channel assignment for the call informs the UE of a traffic-channel on which to engage in the call in the specified second-RAN coverage, thereby enabling the UE to tune to the traffic channel and begin the call without the UE first needing to engage in associated random access signaling with the second RAN.

* * * * *